United States Patent [19]

[11] 3,742,853

[45] July 3, 1973

Landsman

[54] METHOD OF FORMING RELIEF PRINTING PLATE

[75] Inventor: Robert M. Landsman, Norwalk, Conn.

[73] Assignee: The Perkin-Elmer Corporation, Norwalk, Conn.

[22] Filed: June 26, 1972

[21] Appl. No.: 266,207

Related U.S. Application Data

[63] Continuation-in-part of Ser. Nos. 145,187, May 20, 1971, and Ser. No. 145,315, May 20, 1971, and Ser. No. 203,660, Dec. 1, 1971.

[52] U.S. Cl. ............ 101/401.1, 101/395, 250/65 T, 346/76 L, 346/77 E

[51] Int. Cl. ............ B41d 7/00

[58] Field of Search ............ 346/76 L, 77 E; 250/65 T; 101/401.1

[56] References Cited

UNITED STATES PATENTS

| | | | |
|---|---|---|---|
| 2,875,051 | 2/1959 | DeMaria | 101/401.1 |
| 3,644,014 | 2/1972 | Hirschberg | 346/76 L X |
| 3,057,999 | 10/1962 | Newman et al. | 250/65 T |
| 2,825,282 | 3/1958 | Gergen et al. | 101/401.3 |
| 3,221,654 | 12/1965 | Jernt | 101/415.1 X |
| 3,169,061 | 2/1965 | Hudson | 346/77 E |
| 3,474,457 | 10/1969 | Becker | 346/76 L |
| 3,668,028 | 6/1972 | Short | 101/128.4 X |
| 3,314,073 | 4/1967 | Becker | 346/76 L |

*Primary Examiner*—Clyde I. Coughenour
*Attorney*—John K. Conant

[57] ABSTRACT

A relief printing plate is formed by providing a sheet of thermoplastic material that collapses within its own volume when radiant energy, such as infrared radiation, is applied to it, and by shielding areas of the sheet that are to be left in relief with a template made of material, such as aluminum or zinc, which reflects the radiation that will be applied to collapse the sheet. The reflective template may be formed in various ways, as by placing a preformed template on the sheet or by covering a surface of the sheet with a film of the reflective template material and removing selected areas of the film to uncover underlying areas of the sheet and to leave film on other areas in the configuration of the desired template pattern. Then radiant energy which is absorbed by the sheet material and reflected by the template material is applied until the uncovered areas of the sheet collapse below their original surface level and the areas covered by the template remain in relief.

11 Claims, 9 Drawing Figures

METHOD OF FORMING RELIEF PRINTING PLATE

BACKGROUND OF THE INVENTION

This is a continuation in part of each of three copending applications as follows:

Ser. No. 145,187 filed May 20, 1971

Ser. No. 145,315 filed May 20, 1971

Ser. No. 203,660 filed Dec. 1, 1971.

This invention is a method of forming a relief printing plate from a novel type of printing plate blank to produce a relief printing plate that is particularly adapted to be used in conventional letterpress or letterset printing apparatus.

At present plates for letterpress and letterset printing are customarily prepared by casting them of type metal, the molds for the finished plates being formed by typesetting machines, such as Linotype machines.

Considerable effort has been expended to try to simplify and automate as much as possible the process of making letterpress and letterset printing plates on which the particular format of lettering and illustrations to be printed are reproduced in relief. To this end systems have been devised for transforming a desired format automatically into computer language by optical scanning techniques and utilizing a computer to operate typesetting and molding apparatus to form type metal printing plates in the conventional manner. These mold forming and casting techniques are rather expensive and cumbersome, however, and attempts have been made to devise simpler, faster and less expensive plates and plate forming techniques. To this end, systems have been devised for etching blank plates of suitable materials, such as synthetic resin plastics with laser beams or electron beams. However, apparatus utilizing electron beams is generally so expensive and difficult to operate for this purpose as to be economically impractical and lasers currently available do not have sufficient power to etch deep enought within a reasonable amount of time to produce a relief pattern suitable for commercial letterpress and letterset printing. Materials which would be capable of being etched to a suitable depth in an acceptable time interval would be too soft to resist wear or deformation under pressure long enough for more than a limited number of satisfactory impressions to be made. To be commercially practical a printing plate should be able to print in excess of about 70,000 sharp copies.

BRIEF SUMMARY OF THE INVENTION

The method of this invention utilizes a special printing plate blank consisting of a sheet of thermoplastic material, such as a synthetic resin plastic having voids therein, which will collapse within its own volume when heated to its softening temperature by application of radiant energy, such as infrared radiation. In accordance with the invention areas of the sheet which are to be in relief in the finished plate are covered by a template of a material, such as aluminum, bismuth, cadmium, gold, silver or zinc, which reflects the type of radiation to be applied for softening and collapsing portions of the thermoplastic sheet. Then, an appropriate type of radiant energy is applied to the surface of the plate until the areas of the sheet which are exposed soften and collapse and leave in relief the areas that are shielded by the reflective template pattern.

The reflective template pattern may be formed on the thermoplastic sheet in a variety of ways. For example, a reflective template pattern, or elements thereof, such as individual letters or designs, may be precut from thin sheets of suitable reflective material, such as aluminum, and cemented on the surface of the thermoplastic sheet; reflective material in the form of a paste or a liquid may be painted or printed on the sheet; or the sheet may be covered with a thin film of the reflective material (by vapor deposition or impact printing, for example) in which case selected areas of the reflective film are removed so that areas that are left define a template of the desired pattern. Selected areas of the film of reflective material may be removed by scraping (as with a stylus), by acid etching, by an electron beam, by a beam of electromagnetic radiant energy of appropriate wavelength, or by heating selected areas sufficiently to evaporate and remove the film in those areas.

In accordance with a preferred embodiment, the template is formed on the thermoplastic sheet material of the plate blank by placing on the surface of the thermoplastic sheet that is to have a relief pattern formed thereon, a film of material which reflects the type of radiation utilized to collapse the thermoplastic sheet, but which is vaporized by different radiant energy. Radiant energy of the type which vaporizes the film material is then applied to vaporize and remove selected areas of the film to uncover the thermoplastic sheet at these areas and to leave other areas of the film intact in the configuration of the desired template pattern. When the radiation collapsible sheet is made of a thermoplastic material which is softened by radiation within the infrared wavelength range, i.e., from about 2 to about 10 micrometers, zinc is a particularly useful material for the film. Zinc has the unique property of reflecting more radiation than it absorbs at radiation wavelengths greater than about 1.1 micrometer, and of absorbing more than it reflects at radiation wavelengths shorter than this. Thus in accordance with the invention a thin film of zinc (i.e., a film having a thickness on the order of about 1 microinch) is utilized to reflect radiation in the infrared range and to absorb, and be vaporized by, a beam of radiant energy which has a suitable energy density, such as the coherent light beam from a laser, and which has a wavelength less than about 1.1 micrometer. A suitable beam may be applied by a YAG (yttrium-aluminum-garnet) laser beam, which has an effective wavelength of about 1.06 micrometer, or by an argon laser beam which has an effective wavelength in a range of from about 0.48 to about 0.52 micrometer.

In accordance with another embodiment, the surface of the thermoplastic sheet is covered by a thin film of material which reflects the sheet collapsing type radiation; this film is in turn covered by a layer of material which will absorb sufficient heat from a beam of radiant energy, such as a laser beam, to evaporate, and thus remove, the immediately underlying areas of the reflective film. The beam of radiant energy is thus applied to the absorbent layer to vaporize and remove selected areas of the underlying reflective film so that the remaining areas of reflective film define the desired reflective template.

A particular advantage of the method of forming relief printing plates in accordance with the present invention is that a height of relief can be obtained which enables the plate to be used for making a sufficient number of sharp printed copies —in excess of about 70 thousand— to be commerically practical. Beams of radiant energy, as from lasers, have been tried for etching synthetic resin plastic plate material directly, but the etching thus produced has not been sufficiently deep, or has been so costly and time consuming, that it has not been practical for producing commercial letterpress or letterset printing plates. In contradistinction, the shielding and collapsing technique of the present invention provides printing plates that are adapted to be used with existing commercial letterpress and letterset printing apparatus and that compare favorably with previously used printing plates in durability, sharpness of definition and cost.

BRIEF DESCRIPTION OF THE DRAWINGS

The invention is described in detail below with reference to the embodiments illustrated in the accompanying drawings in which.

DETAILED DESCRIPTION OF THE INVENTION

Figures 1, 2, 3, 4, 5:
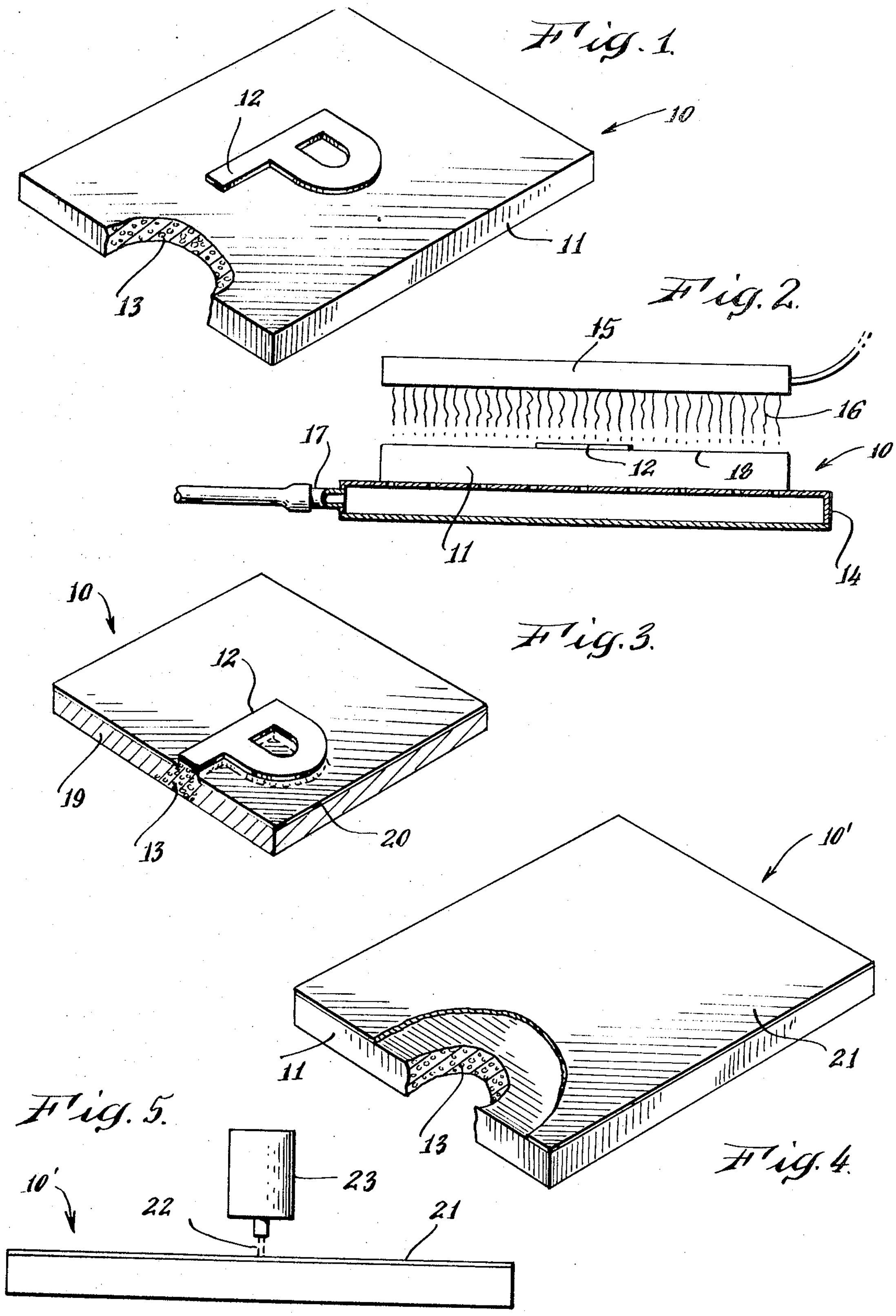
FIG. 1 is an isometric view, partly broken away, of a printing plate blank of the present invention with a reflective template thereon in readiness for radiant energy to be applied for completing the formation of a relief printing plate.
FIG. 2 is a cross-sectional view illustrating apparatus for applying radiant energy to the partially processed blank illustrated in FIG. 1 for completing the formation of the relief pattern defined by the reflective template.
FIG. 3 is an isometric view, partly broken away, showing the relief pattern formed on the plate after the completion of the step illustrated in FIG. 2.
FIG. 4 is an isometric view, partly broken away, of another embodiment of the invention wherein the printing plate blank has on it a film of radiation reflective material, parts of which will be removed to leave a reflective template of the desired configuration.
FIG. 5 is a side view illustrating apparatus and the method applied to the blank shown in FIG. 4 for removing portions of the reflective film to expose portions of the underlying sheet and to leave other portions of the film in the form of a reflective template.

Referring to FIG. 1 of the drawings, a printing plate blank 10 in accordance with this invention consists essentially of a sheet 11 of a thermoplastic material which collapses within itself when heated to its softening temperature by application of a particular type of radiant energy, such as infrared radiation, and a template 12 having the configuration of the letters, numbers, designs or other material it is desired to have in relief on the finished printing plate. In the drawing the template 12 is shown, for illustrative purposes, as being in the form of a letter P.

The template 12 is made of a material that reflects the type of radiant energy to be applied for collapsing the sheet. Thus, when the radiant energy is applied to the surface of the sheet, the exposed areas of the sheet collapse and leave in relief the areas that are shielded by the template.

The sheet 11 is suitably a thermoplastic synthetic resin plastic, such as polyethylene, urethane, polypropylene or nylon for example, which has a multiplicity of small closely spaced voids 13 dispersed uniformly throughout it. The voids 13 may be either open cell pores or bubbles. The smaller the voids, and the more closely they are spaced, the sharper will be the definition of the relief pattern formed. In practice, voids 13 of substantially uniform size —about 0.0003 of an inch or smaller, and preferably about 0.0001 of an inch, in diameter— uniformly and closely spaced throughout the material so that about 50 percent of the volume of the sheet 11 is voids, provides a relief pattern which will more than satisfy current standards of definition and durability for quality book printing. However, acceptable printing is accomplished with a plate formed from a sheet 11 having substantially uniformly sized, uniformly spaced voids whose average diameters are in the range of from about 0.00003 of an inch, minimum, to about 0.003 of an inch maximum —the best results being achieved with voids in the range from about 0.0001 to about 0.001 of an inch in diameter—, the voids comprising from about 15 percent to about 70 percent of the volume of the sheet 11.

A sheet 11 incorporating voids of the desired size and quantity may be formed by sintering particles of suitable thermoplastic material into a coherent porous mass, or by working granules of soluble material, such as sodium chloride, into the thermoplastic material and then leaching out the soluble material. Nylon in which the desired voids 13 are formed by one of the methods mentioned or by any other method capable of producing such voids, provides a suitable sheet 11 for the practice of this invention. It is heat softenable (i.e., its surface tension is reduced, sufficiently to collapse within its own volume by sinking into the voids) by applying infrared radiation which has a wavelength band of from 2 to about 10 micrometers and a black body temperature of from about 600°C to about 1,200°C to the surface of the sheet for from about 2 to about 15 seconds. In a preferred form of a sheet 11 which is to be collapsed by infrared radiation carbon black is incorporated in the sheet —suitably by adding it to the mix during fabrication of the sheet— to assist the absorption of the infrared radiation and thereby hasten the collapse of the surface areas of the sheet exposed to the radiation.

Another type of heat collapsible sheet 11 which has been tested satisfactorily for the practice of the method of this invention is one made of prestressed fibers of a thermoplastic material such as nylon or polypropylene.

The sheet if formed by winding fibers of the material selected around a spindle or core under tension to form a thick roll. The roll is cut radially, removed from the spindle or core, flattened, and cut in slices normal to the length of the fibers. The exposed ends of the fibers at opposite sides of each slice are then fused to hold the slice together by applying enough heat to soften and fuse the outer ends of the fibers without softening the fiber portions in the interior of the slice. The opposite surfaces of the slices formed by the fused ends of the fibers are then preferably smoothed by rolling or pressing. When a radiation reflective template 12 having the configuration desired for the relief pattern is placed on one surface of a sheet 11 consisting of one of these slices and radiation is applied, fibers in the areas of the sheet that are not shielded by the template are heated and as they are heated to the softening point, the plastic memory of the individual prestressed fibers causes them to contract. The contracting fibers in effect shrink away from the surface of the side of sheet to which the radiation is applied, leaving in relief the areas of that surface which are shielded by the template 12.

Infrared radiation is appropriate for softening and collapsing sheets 11 made of synthetic resin plastics, such as nylon, polyethylene, polypropylene and urethane, and is suitably reflected, in accordance with the practice of this invention, by a template 12 of aluminum, bismuth, cadmium, gold, silver or zinc, for example.

FIG. 2 illustrates a suitable arrangement for applying infrared or other appropriate radiation for collapsing uncovered areas of the sheet 11. As shown, the plate blank 10 consisting of the sheet 11 with a reflecting template 12 thereon is placed on a vacuum hold-down device 14 under an infrared panel lamp element 15. The infrared panel lamp element 15 illustrated may be a conventional type of producing infrared radiation over an area, indicated at 16, coextensive with the area of the plate surface to be irradiated, and is adapted to apply infrared radiation of a wavelength within a wavelength band of from 2 to 10 micrometers, corresponding to a black body temperature of from about 600°C to about 1,200°C. Suitable infrared radiation could be provided by alternative means, such as an incandescent lamp with an appropriate filter or a $CO_2$laser.

In the preferred practice of the invention a pressure differential is created across the plate 10 while the plate is being irradiated to collapse the uncovered areas of the surface of the sheet 11, the greater pressure being at the upper surface to which the radiation is applied. This pressure differential reduces the period of exposure required to produce the amount of height difference desired between the relief pattern and the collapsed background; it also increases the degree of relief obtainable, and facilitates the uniform and complete collapse of the thermoplastic sheet material into the voids 13.

In the apparatus embodiment shown in FIG. 2, the pressure differential across the plate 10 during irradiation is applied by a hold-down device 14, which, as indicated, is a conventional type having holes opening through its upper support surface into a central chamber in which a partial vacuum is created by a conventional vacuum pump (not shown) connected to the chamber outlet 17.

Alternatively the pressure differential could be applied by placing the lamp element 15 and a support platform, such as the vacuum hold-down device 14, for the plate 10 in a chamber in which a positive pressure is created by blowing air into it during the irradiation. Using the vacuum hold-down device 14 as the support surface for the plate 10 in a positive pressure chamber would assure the creation of a good pressure differential, but the use of either the hold-down device 14 or a positive pressure chamber with a plane solid support surface for the plate 10 alone would also be effective.

In operation of the apparatus illustrated in FIG. 2, when the plate 10 is on the vacuum hold-down device 14 and a partial vacuum (the amount of which is not critical) is applied to the underside of the plate, the lamp element 15 is turned on long enough —from about 2 to about 15 seconds— for the uncovered areas, indicated at 18, of the sheet 11 to be softened and collapse. The collapsed portions are indicated at 19 in FIG. 3.

The time required to heat the uncovered portions of the sheet 11 to the softening point may be reduced by preheating the sheet to a temperature approaching its softening temperature. This may be done by blowing warm air over it or by placing it in a heated chamber for a brief time, for example. Such preheating also appears to improve the sharpness or resolution of the relief.

FIG. 3 shows in cross section the appearance of the collapsed and of the relief portions of the plate 10 after irradiation. The collapsed portions are solid while the portions shielded by the reflective template pattern 12 still contain voids 13 and are substantially their original thickness. The softening of the sheet to collapse it by irradiation in the above manner results in a skin 20 over the collapsed areas which seals the surface even though there may be small pores left in the interior of the collapsed regions. Thus, if the voids 13 are open cell pores interconnected through the sheet 11, it would be possible to utilize a plate of this invention, which has a relief pattern formed thereon as just described, in a silk screen form of reproduction processing. For this purpose the reflective template pattern 12 would be removed from the relief portions so that ink squeezed onto the back of the plate (underside in FIG. 3) would pass through the open cell pore structure at the relief portions of the plate but could not pass through the substantially solid collapsed portions, for even if there were some minute passages through the collapsed portions, these would be closed off by the skin 18.

The template 12 may be formed and placed on the sheet 11 in a number of different ways. For example, particular designs or individual letters may be cut from a sheet of suitable reflective material and placed on the sheet in a desired arrangement, or a template design may be painted or printed thereon using a paste or solution of the reflective material.

Alternatively, as illustrated in FIG. 4 by a printing plate blank designated 10′, the radiation collapsible sheet 11 may be initially coated or otherwise covered with a film 21 of material which will reflect the type of radiation to be used to collapse exposed portions of the sheet 11. A reflective template 12 is then formed by removing selected areas of the film to uncover underlying areas of the sheet 11 and leave intact areas of the film 19 corresponding to the configuration of the areas it is desired to have in relief on the finished plate. The selected areas of the film 21 may be removed in a variety of ways; for example, they may be scraped off with a stylus, they may be acid etched or removed with an electron beam or they may be removed by being vaporized as described in detail below.

In a preferred form the film 21 is a material which is vaporized by different radiant energy than the radiant energy applied for collapsing exposed areas of the sheet 11. With a sheet 11 of a material that is collapsed by infrared radiation as described above, the film 21 is suitably zinc, which has the unique characteristic of absorbing, and being vaporized by, radient energy of a wavelength less than about 1.1 micrometer while reflecting radiant energy of other wavelengths within the infrared range. The zinc film 21 must be thick enough to provide surface areas which will reflect the radiant energy that will be applied to collapse the portions of the sheet 11 not covered by the film, and it will normally be made as thin as practical in order for it to be vaporized and removed rapidly with a minimum amount of radiant energy applied for this purpose. In practice, a zinc film 21 on the order of 1 microinch thick satisfies these criteria.

FIG. 5 illustrates a method of processing the plate blank 10' of FIG. 4 to remove selected areas of the film 21 to leave a template 12. A modulated beam 22 of light, which has sufficient energy density, such as the coherent light beam of a laser, and which has a wavelength of less than about 1.1 micrometer is suitable for vaporizing and removing selected areas of a film 21 of zinc. YAG and Argon lasers are particularly suited for this purpose. The laser beam 22 is successively swept across the surface of the film 21 to scan the film surface in a raster pattern and the laser is operated to modulate the beam as it scans the film in order to vaporize selected areas and leave others intact in accordance with the template pattern desired. As described below in more detail with reference to the apparatus shown in FIG. 9, the modulation of the laser beam 22 may be controlled by signals from apparatus which scans a paste-up, or other graphic representation of the desired format in synchronism with the scanning of the film 21 on plate 10'. The timing of the scanning of the film 21, and the modulation of the laser beam 22 could also be controlled by known data processing and optical scanning apparatus and techniques to reproduce a desired relief configuration defined by a computer program.

When selected areas of the zinc film 21 are removed by the laser beam 22 to leave a template 12 of the film, the plate 10' has the appearance of the plate 10 of FIG. 1 and is further processed in the manner described with reference to FIG. 2 to produce a finished relief printing plate having the appearance of the plate 10 as shown in FIG. 3.

Figure 6:
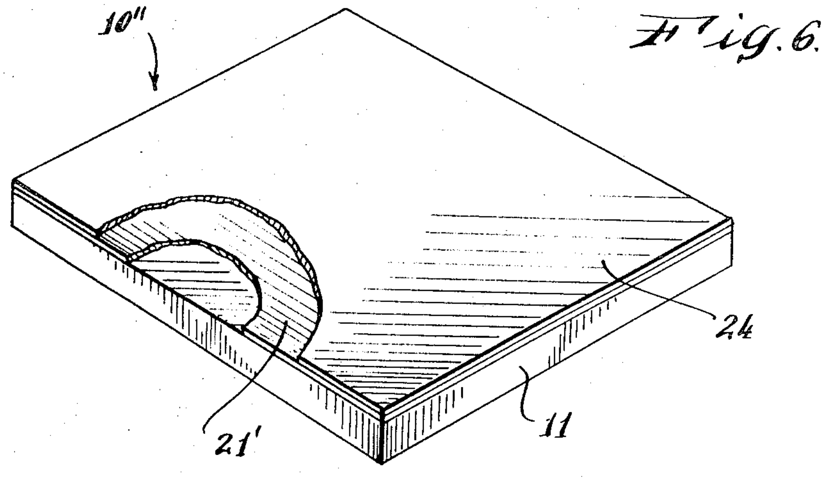
FIG. 6 is an isometric view, partly broken away, of still another embodiment of the invention in which the printing plate blank has on it a film of radiation reflective material covered by a layer of radiation absorbing material with which selected portions of the reflective film are removed to leave a reflective template by applying radiation to heat selected areas of the absorbent layer for vaporizing and removing the underlying areas of the film.

FIG. 6 illustrates another form of plate blank, 10'', embodying the invention. In this form the radiation collapsible sheet 11 is covered with a reflective film 21', which is adapted for selective areas to be removed by being heated to a temperature at which it evaporates. This is accomplished by covering the reflective film 21' with a layer 24 of non-reflective material, such as carbon or graphite, which will absorb sufficient heat from a particular type of radiant energy, such as coherent light from a laser, to evaporate underlying areas of the reflective film 21'.

The criteria for the reflective film 21' are, (1) that it must reflect the radiant energy applied to soften exposed portions of the sheet 11 so that the portions of the sheet 11 which are immediately below and thus shielded by the reflective film will not be softened to the collapsing point and (2) that it must be sufficiently thin or of such composition that selected, well defined areas of it are vaporized and pass off before the heat applied for vaporizing it heats the underlying material of sheet 11 to the softening point. A suitable reflective film 21' is a thin film of aluminum, on the order of about 1 microinch thick, which may be applied to the sheet 11 by vacuum deposition or other well known techniques.

The criteria for absorbent layer 24 are, (1) that it absorb sufficient heat from a narrow beam of a particular type of radiant energy to vaporize the area of the reflective film 21' immediately underlying the portion of the abosrbent layer 24 to which the latter beam of radiant energy is directed and (2) that it is easily removable from the portions of the reflective film 21' which are not vaporized and which form the reflective template 12 (FIG. 1). The areas of the absorbent layer 24 that are heated to vaporize underlying areas of the reflective film 21' are carried off with the vaporized material of film so that the surface of the sheet 11 is exposed at these areas.

The absorbent layer 24 is suitably a film of carbon black on the order of 1 microinch thick. Heat for evaporating underlying portions of the reflective film 21' is suitably applied by a laser beam having a wavelength of about 1 micrometer. A YAG (yettrium aluminum garnet) laser is particularly suited for this purpose. The carbon black of absorbent layer 24 remaining on the portions of the reflective film 21' which form the reflective template 12 are easily removed by wiping with alcohol.

Figure 7:
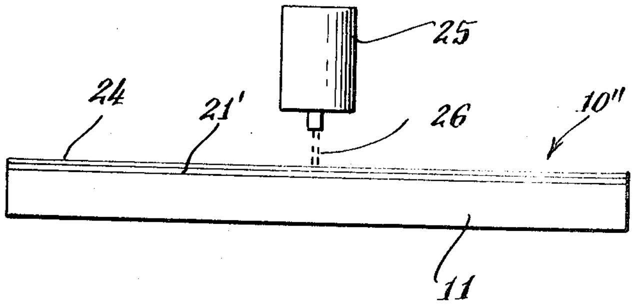
FIG. 7 is a side view of apparatus for applying radiant energy to selected areas of the absorbent layer on the plate blank of FIG. 6 for heating and removing underlying areas of the reflective film so that areas of the reflective film remaining define a reflective template.
Figure 8:
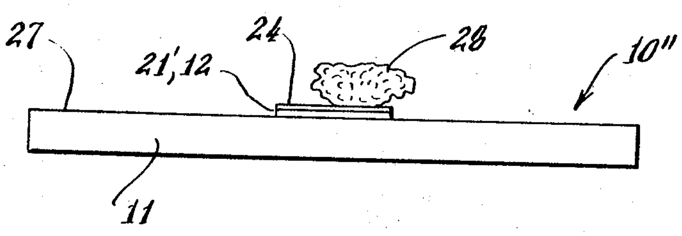
FIG. 8 illustrates the removal of the portions of the absorbent layer remaining on the reflective film template after the performance of the method step illustrated in FIG. 7.

FIGS. 7 and 8 illustrate the manner in which the plate 10'' of FIG. 6 is adapted to have a relief pattern formed thereon. As shown in FIG. 7, a YAG laser 25 is applied for selectively heating portions of the absorbent layer 24 for evaporating underlying areas of the reflective film 21' in a pattern such that the areas of film 21' left intact define a reflective template 12 of the desired configuration. The laser 25 may be mounted for its beam 26 to sweep across the surface of the plate 10'' in a scanning pattern and may be operated for its beam 26 to be modulated, as the beam 26 sweeps across the plate surface for heating selected portions of the absorbent layer 24. As in the method subsequently described with reference to FIG. 9, modulation of the laser beam 26 may be controlled by signals from apparatus which scans a paste-up of the desired format.

As the selected areas of the reflective film 21' are vaporized and removed by heating selected areas of the absorbent layer 24, the heated areas of the layer 24 are carried off with the vapors, so that, as illustrated in FIG. 8, the underlying surface areas of the thermoplastic sheet 11 are uncovered as indicated at 27. The areas of reflective film 21' left on the sheet 11 in the form of a reflective template 12 are, however, still covered by material of absorbent layer 24 which should then be removed. This remaining portion of absorbent layer 24 is suitably wiped off with sponge 28 saturated with alcohol. The partially processed plate 10'' is then further processed to a finished relief printing plate in the manner described with reference to FIGS. 2 and 3.

In practice it has also been found that a YAG laser beam will effectively vaporize and remove selected areas of a thin infrared-radiation-reflective film 21 on the order of 1 microinch thick, of aluminum without having to apply an absorbent layer 24, as just described, when the aluminum film is supported on a thermoplastic sheet 11 that contains a minor percent, i.e., less than about 1 percent, carbon or graphite powder or powdered carbon black to facilitate absorption of the radiation, as described above. In this instance a film about 1 microinch thick of aluminum is thin enough to transmit radiant energy having a wavelength of about 1 micrometer, which is a wavelength a YAG laser customarily produces in addition to its principal wavelength of about 1.06 micrometers. This approximately 1 micrometer wavelength radiation transmitted through the aluminum film is then absorbed by the carbon or graphite in the sheet 11 below, and, in cooperation with some of the laser radiation which is absorbed directly by the aluminum, heats the adjacent portion of the aluminum film sufficiently to vaporize and remove it. The normal oxide occurring naturally on an exposed aluminum surface may also assist by absorbing some radiation, in the manner of the absorbent layer 24 as described above with reference to embodiments illustrated in FIGS. 6, 7 and 8. Assuming that the normal oxide accummulation does act to some extent like the absorbent layer 24, this oxide coating does not interfere with the infrared reflectivity of the aluminum film portions left intact in the form of reflective template pattern 12. That is, the aluminum film template pattern 12 need not be wiped, or specially cleaned in any way; infrared radiation applied to collapse the exposed areas of the sheet 11 is effectively reflected from the aluminum film covered areas so that these areas are left in relief in the manner previously described.

Figure 9:
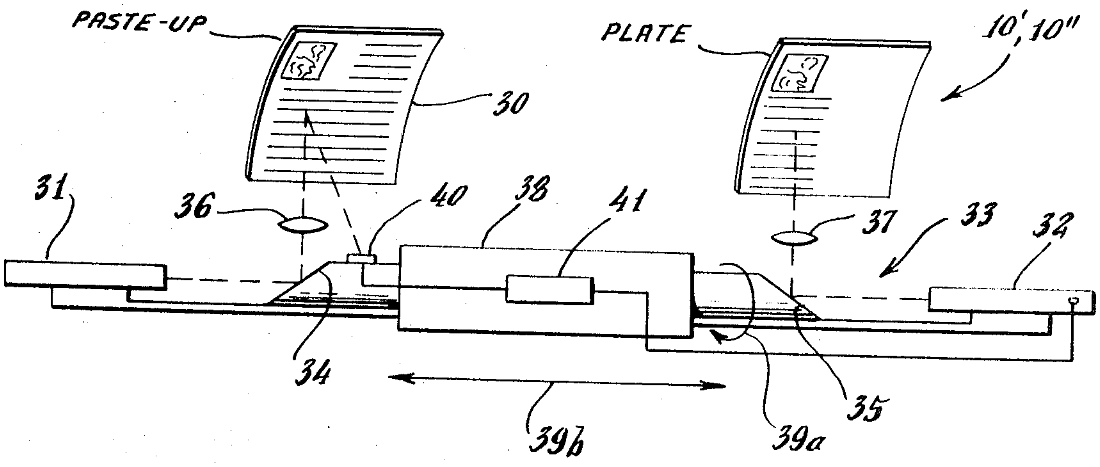
FIG. 9 is a schematic illustration of apparatus for shaping a reflective template pattern on a printing plate blank of either the FIG. 4 or FIG. 6 embodiments in conformance to a graphic representation of material to be reproduced by the finished printing plate.

FIG. 9 illustrates a form of apparatus suitable for processing a printing plate 10 or 10″ of this invention to produce a template 12 of a desired configuration on the plate. The template 12 produced by the apparatus is a reproduction in template form of writing, pictures, or other material appearing on a paste-up 30, or other graphic representation, of material to be reproduced by the finished relief printing plate.

The paste-up 30 is scanned by a laser 31 to produce signals that are applied to modulate the beam from a second laser 32 which is arranged to scan a plate 10′ or 10″ in synchronism with the scanning of the paste-up, and in a corresponding scan path. The signals vary in accordance with the relative lightness or darkness of successive portions of the paste-up surface scanned by the laser 31 and are connected to modulate the beam of laser 32 between a low intensity at which it has no effect on the plate 10′ or 10″ and a high intensity at which it either vaporizes a small spot of a zinc film 21 on a plate 10′ or heats a small spot of an absorbent layer 24 of a plate 10″ sufficiently to vaporize and remove a portion of reflective film 21 from a plate 10′ or reflective film 21′ from a plate 10″The reflective film is thus removed in a pattern which corresponds either to the highlight or to the background of the material on the paste-up 30 depending on the way in which the signals are applied to modulate the beam of laser 32. For producing the usual printing plate the connections will be arranged so that signals representing the background of the material on the paste-up 30 will modulate the laser 32 beam to the higher intensity so that the reflective film left on the plate forms a reflective template 12 corresponding to the letters and designs appearing on the paste-up. In the drawing the material represented on the paste-up 30 is indicated as being lines of copy and a half tone picture as on a conventional newspaper or book page.

In the apparatus illustrated in FIG. 9 the paste-up 30 and plate 10′ or 10″ are supported in curved condition concentrically relative to the axis of an elongated rotating double scanning assembly 33. The lasers 31 and 32 are carried on opposite ends of the rotating assembly 33 for their beams to be deflected by angular mirrors 34 and 35 through focussing lenses 36 and 37 to impinge respectively on the paste-up 30 and the plate 10′ or 10″.

The assembly 33 is rotated by drive mechanism indicated at 38 and is simultaneously moved axially as indicated by the arrow 39*a* and 39*b* by suitable translational drive means such as a linear induction motor so that lasers 31 and 32 scan along a spiral path. The entire scanning assembly 33 is suitably mounted on an air bearing cross member with suitable connections made to a source of electric power.

The beam from the laser 31 as focussed on the paste-up 30 by the lens 36 is reflected back to a detector 40 which converts the reflected light of the beam into electric signals whose intensities are proportional to the intensity of the reflected light received. The detector 40 is suitably a photomultiplier, or photodiode, and is connected to actuate a modulator 41. The modulator 41 is connected to modulate the intensity of the beam from the laser 32 in proportion to the intensity of the signals received from the detector 40 for reproducing a reflective template 12 on the plate 10′ or 10″ corresponding to the material represented on the paste-up 30. For letterpress or letterset printing plates the material reproduced in relief on the plate 10′ or 10″ must be in reverse; for this purpose the signals from the detector 40 are fed to the modulator 41 through a delay line and suitable electronics which store the signals temporarily and then forward them to the modulator 41 in reverse order for each line. On the other hand, if the material is to be reproduced in relief in its original form, i.e., not reversed, as for making pages of braille, the delay line and the signal reversing electronics would be omitted. In this latter use, the finished relief plate would itself be the readable end product, namely a page of braille.

The laser 31 is suitably a neon helium laser which has an operating wavelength of 0.6328 microns, and the lens 36 is selected to focus the beam from laser 31 into a spot of about 0.001 of an inch in diameter on the paste-up 30.

A suitable laser 32 for use with either a plate blank 10′ or 10″ is a YAG laser which produces a beam of light having a wavelength of about 1.06 microns. The lens 37 is selected to focus the beam from laser 32 into a spot of about 0.001 of an inch in diameter on the surface of the plate 10′ or 10″.

When a plate blank 10′ or 10″ has thus had a reflective template 12 formed thereon, the plate is removed from the apparatus and further processed in the manner described with reference to FIG. 2 to produce a finished relief printing plate of the type illustrated in FIG. 3.

What is claimed is:

1. A method of forming a relief printing plate for letterpress or letterset printing and the like comprising:

providing a sheet of thermoplastic material that is heat softenable by radiant energy having a wavelength greater than 1.1 micrometers and that has a multiplicity of small voids substantially uniformly distributed therein;

providing on a surface of said sheet a film on the order of 1 microinch thick of a metal that reflects radiant energy having a wavelength greater than about 1.1 and that is from the group of metals consisting of aluminum, bismuth, cadmium, gold, silver and zinc;

applying to selected areas of said film, a beam of radiant energy having an energy density at least approximating the energy density of a laser beam and a wavelength of less than 1.1 micrometers and applying said beam thereto a sufficient length of time to vaporize the film at said selected areas; and thereafter applying radiant energy having a wavelength greater than 1.1 micrometers to the surface of the sheet on which the film was placed, for a sufficient time for the areas of the sheet from the surface of which the film has been vaporized to soften sufficiently to collapse into said voids, whereby the surface areas of the sheet from which the film has been vaporized collapse below, and leave in relief, the areas shielded by unvaporized areas of the film.

2. The method of claim 1 including applying a pressure differential across the sheet while applying said radiant energy for collapsing said unshielded areas of the sheet, the greater pressure being at the surface to which the radiation is applied.

3. The method of claim 1 including preheating the sheet to a temperature close to, but below, its softening temperature prior to the application of said radiant energy for collapsing said unshielded areas of the sheet.

4. The method of claim 1 in which the sheet of thermoplastic material provided is of a material from the group consisting of nylon, polypropylene and polyethylene.

5. The method of claim 4 in which the radiation applied to soften and collapse unshielded areas of the sheet is infrared radiation having a wavelength in the range of from about 2 to about 10 micrometers.

6. The method of claim 1 in which the beam of radiant energy applied to vaporize selected areas of the film is a laser beam of a laser of the group consisting of Argon and YAG lasers.

7. The method of claim 1 in which the film provided is a film of zinc.

8. The method of claim 1 in which the film provided is a film of aluminum.

9. The method of claim 1 in which the sheet provided is a sheet of said thermoplastic material having incorporated therein a minor percentage of material from the group consisting of powdered carbon, powdered graphite and carbon black.

10. The method of claim 1 which includes providing on said film a layer of a material that absorbs sufficient heat from a beam of radiant energy having a wavelength of less than 1.1 micrometers to vaporize underlying areas of the film and in which a beam of said radiant energy having an energy density at least approximating the energy density of a laser beam and a wavelength of less than 1.1 micrometers is applied to selected areas of said layer a sufficient length of time to vaporize the immediately underlying areas of the film, and, thereafter removing the areas of said layer remaining on unvaporized areas of the film prior to said application of radiant energy having a wavelength greater than 1.1 micrometers

11. A method of forming a relief printing plate for letterpress or letterset printing and the like comprising:

providing a sheet of thermoplastic material that is heat softenable by infrared radiant energy having a wavelength greater than 1.1 micrometers, and that has a multiplicity of small voids substantially uniformly distributed therein;

providing on a surface of said sheet a film on the order of 1 microinch thick of a metal that reflects radiant energy having a wavelength greater than about 1.1 and that is from the group of metals consisting of aluminum and zinc;

applying to selected areas of said film a beam of radiant energy from a laser of the group of lasers consisting of Argon and YAG lasers producing laser beams and having a wavelength of less than 1.1 micrometers and applying said beam to said selected areas a sufficient length of time to vaporize the film at said selected areas; and thereafter applying said infrared radient energy to the surface of the sheet on which the film was placed, for a sufficient time for the areas of the sheet from the surface of which the film has been vaporized to soften and collapse into said voids, whereby the surface areas of the sheet from which the film has been vaporized collapse below, and leave in relief, the areas shielded by unvaporized areas of the film.

* * * * *